United States Patent [19]

Gould

[11] 4,158,711

[45] Jun. 19, 1979

[54] HOT KNIFE WELDS IN THERMOPLASTIC STRAP

[75] Inventor: Russell J. Gould, Mount Prospect, Ill.

[73] Assignee: Signode Corporation, Glenview, Ill.

[21] Appl. No.: 793,445

[22] Filed: May 4, 1977

[51] Int. Cl.² .............................................. B32B 3/26
[52] U.S. Cl. ........................................ 428/57; 2/338; 156/292; 156/306; 428/188
[58] Field of Search ................... 428/188, 542, 44, 57, 428/77, 178; 156/157, 292, 306; 2/338; 190/57, 59

[56] References Cited

U.S. PATENT DOCUMENTS

| | | | |
|---|---|---|---|
| 1,650,051 | 11/1927 | Smith | 428/60 X |
| 1,830,791 | 11/1931 | Guinzburg | 428/157 X |
| 3,316,687 | 5/1967 | Bartlett, Jr. | 53/33 |
| 3,368,323 | 2/1968 | Wood | 156/157 X |
| 3,490,973 | 1/1970 | Graff et al. | 156/292 X |
| 3,748,214 | 7/1973 | Withers | 428/188 X |
| 3,783,086 | 1/1974 | Plummer | 428/188 X |
| 4,069,359 | 1/1978 | DeMarse | 428/188 X |

Primary Examiner—Henry F. Epstein
Attorney, Agent, or Firm—Dressler, Goldsmith, Clement, Gordon & Shore, Ltd.

[57] ABSTRACT

Ends of thermoplastic polymeric strap are joined together using a hot sealing blade of substantially rectangular transverse cross section and having corners with an effective radius in the range of about 0.005 inches to 0.03 inches. Joints or welds produced by this sealing blade have a novel configuration in which a fused interfacial region includes an annular mass defining at least one elongated cavity. At least two such cavities are present within the region and together span the width of the strap. Such welds are stronger than prior art welds, and can consistently be produced having a joint strength of at least about 85 percent of the strap strength.

9 Claims, 8 Drawing Figures

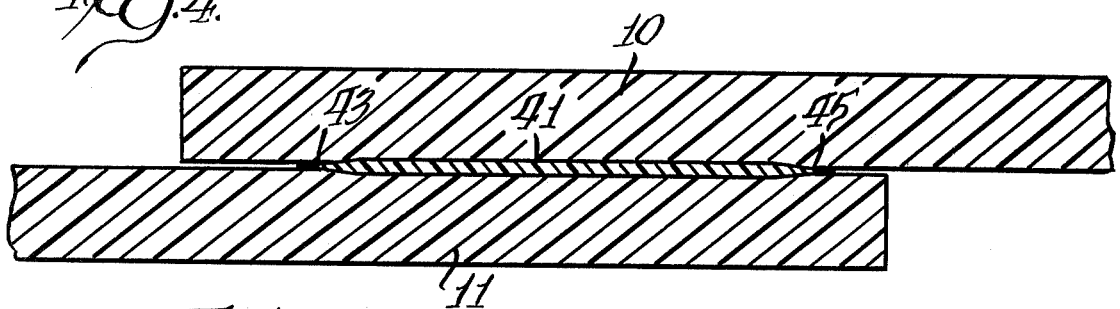
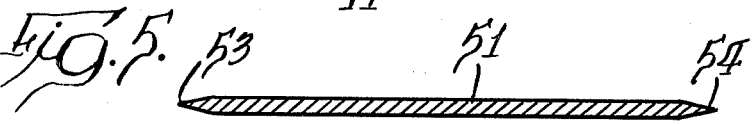
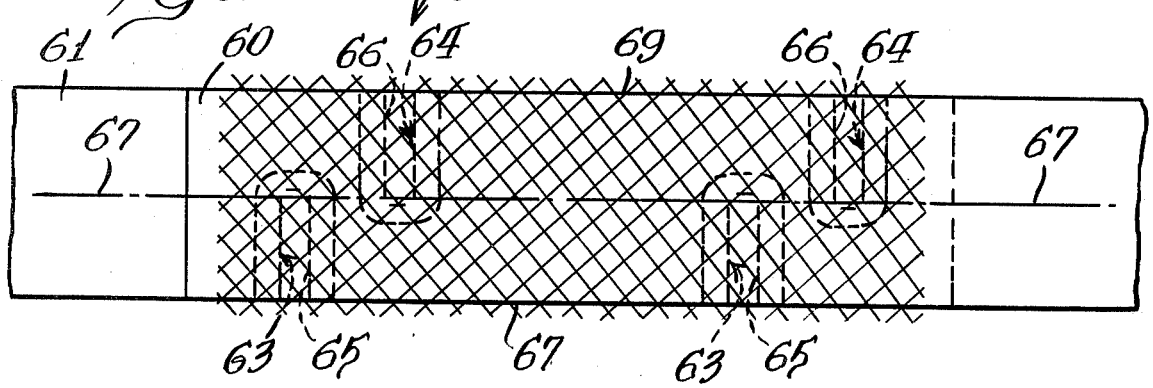
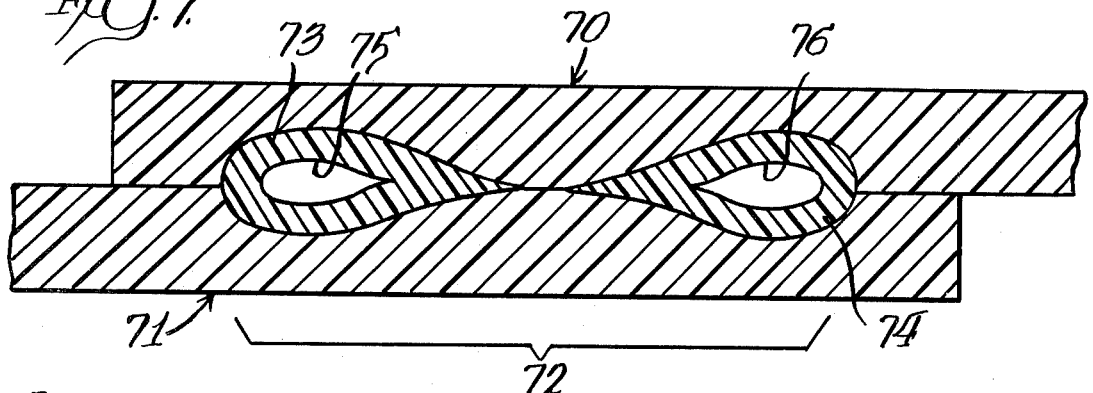

HOT KNIFE WELDS IN THERMOPLASTIC STRAP

BACKGROUND OF THE INVENTION

This invention relates to an apparatus and a method for heat sealing overlapping ends of thermoplastic strap.

In the packaging field, it is common practice to provide tensioned bands (usually in the form of steel straps) about single packages or groups of packages for reinforcement and for securement purposes. The steel bands or straps usually are held in place by sleeve-like seals which are crimped about overlapping ends thereof. In some cases, the overlapping ends are spot welded together. Recently, as a substitute for steel band strapping material, straps formed of various polymeric materials have been utilized. These particular strapping materials are thermoplastic and usually are secured by heat sealing overlapping strap ends to one another.

In U.S. Pat. No. 3,368,323 to Wood there is disclosed a method which comprises positioning the end portions of the strap in face-to-face spaced apart relationship; inserting a heating element between the end portions of the strap and pressing the end portions of the strap against the heating element while it is hot to cause the strap surfaces engaging the heating element to soften; removing the heating element by sliding in a longitudinal direction of the strap from between the end portions of the strap; and pressing the softened surfaces of the strap together. The heating element is described as being "preferably in the form of a flat blade".

In a commercial apparatus similar to that of the Wood patent, the hot knife blade is flat, with a thickness of about one-eighth of an inch, and has tapered blade ends that are ground to a point. A major drawback encountered in the use of this apparatus has been that it has not been possible to consistently produce welds having a high joint strength of at least 70 percent.

U.S. Pat. No. 3,316,687 to Bartlett also discloses a method for securing ends of thermoplastic strap by hot knife techniques. In this method, a thin blade heating element is positioned between two spaced apart ends of thermoplastic strap to soften the opposing face areas of the strap ends. Preferably, the heating element does not contact the opposing face areas, but is sufficiently hot so that the opposing face areas soften by radiant heat transfer in a short period of time. Contact with the heating element is preferably avoided in order to prevent a coating of strap material from building up on the heating element. Once the face areas are softened, the heating element is withdrawn, and the strap ends are clamped together and held under pressure to effect a weld.

SUMMARY OF THE INVENTION

The present invention provides welds for thermoplastic strap which have improved joint strength. The welds comprise at least one fused interfacial region which includes an annular mass defining therewithin at least one elongated cavity. At least two such cavities are present within the fused interfacial region and collectively span the width of the strap.

The present invention also provides a convenient device for heat sealing overlapping end portions of thermoplastic polymer binding strap so as to form welds having the aforementioned configuration and improved strength. The device includes an elongated, heatable sealing blade and means for positioning the sealing blade between opposing faces of the overlapping end portions to melt an interfacial region. The sealing blade has a substantially rectangular cross-sectional shape in the transverse direction of the blade with corners of a radius of about 0.005 inches to about 0.03 inches.

The invention also provides a method of heat sealing overlapping end portions of a thermoplastic strap. The method comprises inserting an elongated heatable sealing blade having corners with a radius in the range of about 0.005 inches to about 0.03 inches between the overlapping portions of the strap and in pressure contact with adjacent inner faces thereof for a time sufficient to soften the inner faces; removing the inserted sealing blade in a direction generally transverse of the strap and substantially parallel to the inner faces of the overlapping ends while pressure is maintained on the softened inner faces to simultaneously urge the softened material thereof to form an interfacial region of softened material; and maintaining the pressure contact for a time period sufficient for the formed interfacial region to cool and transform into a fused solidified interfacial region.

Welds produced by the elongated heatable sealing blade have greater joint strength than welds produced in accordance with previously known techniques. Surprisingly, it has been discovered that only sealing blades which have corners with a radius in the range of about 0.005 inches to 0.03 inches produce the strong, cavity-containing welds of this invention. Furthermore, as opposed to the teachings of the aforementioned U.S. Pat. No. 3,368,323 wherein the knife blade is preferably inserted and withdrawn in a direction longitudinal of the strap, the knife blade of the present invention must be inserted and withdrawn in a direction generally transverse of the strap to produce welds embodying this invention. And, as opposed to the teachings of U.S. Pat. No. 3,316,687, the sealing blade is maintained in pressure contact with the opposing inner faces of the strap end to form the welds of the present invention.

THE DRAWINGS

FIG. 4 is an enlarged sectional view of a prior art weld;

FIG. 5 is an end view of a prior art sealing blade;

FIG. 6 is a fragmentary plan view of a welded strap loop showing a weld embodying the present invention;

FIG. 7 is an enlarged sectional view of a weld embodying the present invention; and FIG. 8 is a transverse cross-sectional view of two heating blades with one corner of the view enlarged.

DETAILED DESCRIPTION

Figure 1:
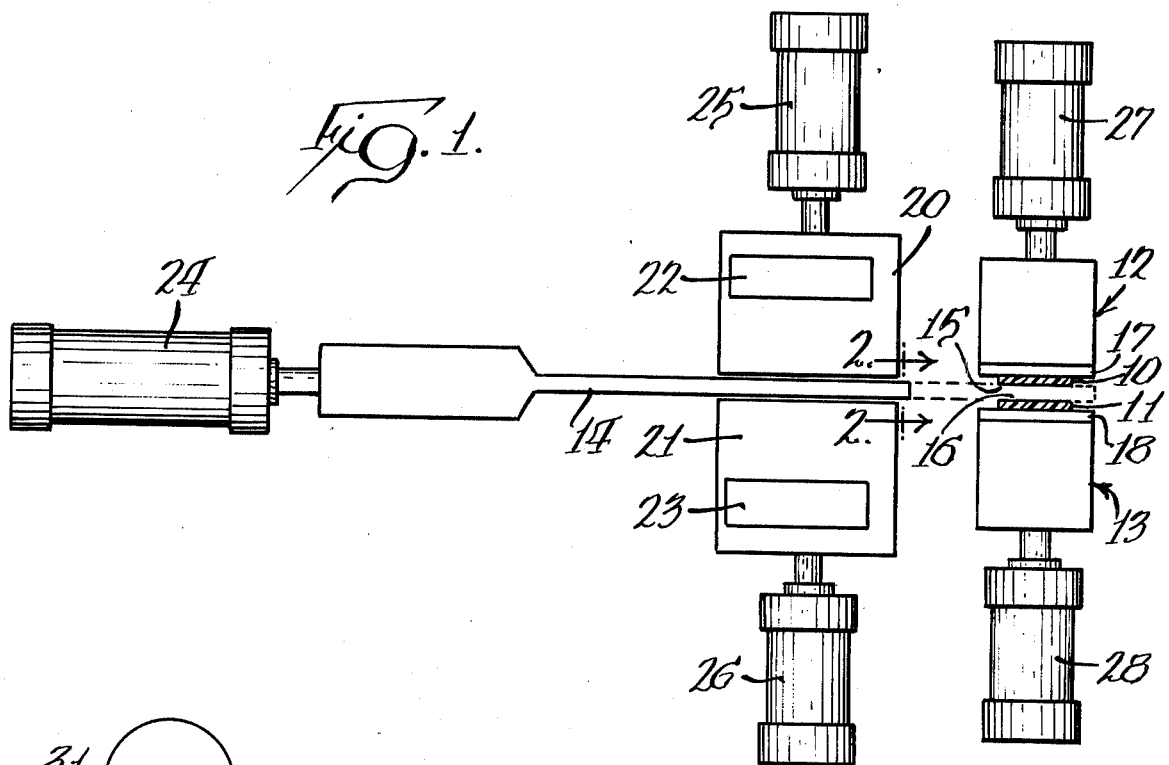
FIG. 1 is a schematic representation of an apparatus embodying the present invention and suitable for sealing thermoplastic strap.

Referring to FIG. 1, which is a schematic representation of the apparatus and method for heat sealing the overlapping end portions of thermoplastic strap, end portions 10 and 11 of a thermoplastic strap ligature having a generally rectangular cross section are held in a face-to-face, spaced apart relationship by jaws (not shown) with end portion 10 underlying a pressure block 12 and end portion 11 resting on pressure block 13. Typically, a thermoplastic strap used for packing may be a polyethylene terephthalate strap having a thickness of about 0.02 inch. The strap usually is from ¼ inch to about 1¼ inches wide. In the drawings, the strap is shown in a greatly enlarged scale for the purpose of clarity. The portion of the strap between ends 10 and 11 will normally be tensioned about an article such as a carton or box at the time of the heat sealing operation. Preferably, the tensioning is accomplished in such a way that the overlapping end portions are relaxed or untensioned during the sealing operation.

To form the novel welds of the present invention, elongated heatable sealing blade 14 of the present invention is inserted between the overlapping end portions 10 and 11 of the strap and maintained in pressure contact with the respective opposing inner faces 15 and 16 of the strap ends 10 and 11 for a time sufficient to soften the inner faces, preferably to a depth of several thousandths of an inch. The sealing blade 14 is then removed in a direction generally transverse of the strap and substantially parallel to the inner faces 15 and 16 of the overlapping ends 10 and 11, while pressure is maintained on the softened inner faces so as to simultaneously urge the softened material of one face against the softened material of the other face and form a merged, interfacial region of softened material. The strap ends are maintained in pressure contact for a time sufficient for the formed interfacial region to cool and transform into fused, solidified, interfacial region 35 shown in FIG. 3.

To carry out this method, the elongated heatable sealing blade 14 is initially positioned with its elongated dimension generally transverse of the length of the strap and is held in contact with platens 20 and 21, which are heated by heating means 22 and 23, until the blade 14 reaches a desired operating temperature. To join ends 10 and 11 of the strap, the platens 20 and 21 are removed from the blade 14 by fluid piston means 25 and 26 and the heated blade is then thrust between the end portions 10 and 11 in a direction transverse to the length of the strap by blade positioning piston means 24. The strap ends are pressed against the heated sealing blade 14 by fluid piston means 27 and 28 which move the pressure blocks 12 and 13 toward the sealing blade. The inner surfaces 15 and 16 of end portions 10 and 11 are held against the heated sealing blade 14 for a time sufficient to soften the inner surfaces 15 and 16 to a depth of about a few thousandths of an inch. The knife blade is then withdrawn transversely of the strap from between the strap ends while the pressure blocks 12 and 13 exert pressure on the ends so that the softened surfaces are substantially simultaneously forced against each other to form a continuous interfacial region of softened or molten material. Suitably, pressure blocks 12 and 13 have resilient (e.g., rubber or elastomeric) surfaces 17 and 18 to uniformly distribute the pressure thereafter continually exerted on the end pieces 10 and 11 for a time period sufficient to solidify the softened interfacial material into a fused interfacial region 35 shown in FIG. 3.

Alternatively, the end portions 10 and 11 may be first pressed together, and the heated blade 14 forced between the inner surfaces 15 and 16, held therebetween for a dwell time sufficient to soften the inner faces of the end portions, and subsequently withdrawn. As previously discussed, the end portions 10 and 11 are held together under pressure while cooling and for a time period sufficient to allow the interfacial molten mass to solidify or harden into a fused interfacial region. The pressure applied to the strap ends may be varied, for example, by increasing the pressure after the blade 14 has been interposed between the end portions, and/or by increasing the pressure after the blade 14 has been removed. Alternatively, the pressure holding the end portions together may be held constant during the entire welding operation.

Figure 2:
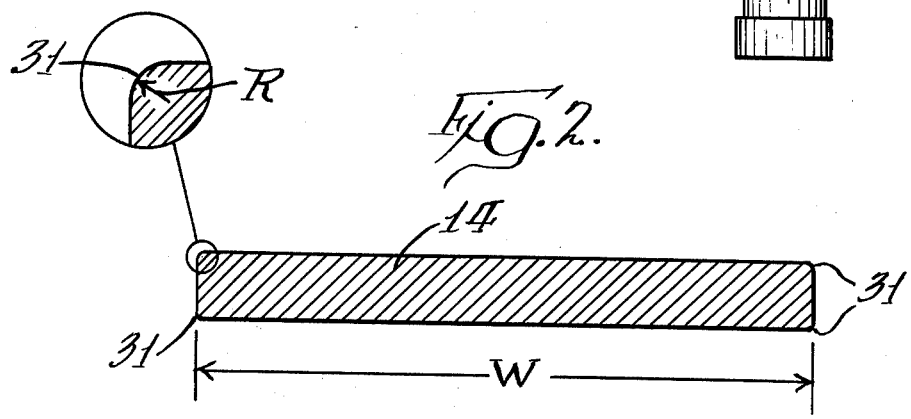
FIG. 2 is a transverse cross-sectional view of the sealing lade shown in FIG. 1 taken along plane 2—2 in FIG. 1 with one corner of the view enlarged.

FIG. 2 shows a cross-sectional view of an elongated heatable sealing blade or knife 14 of the present invention with the section taken transversely across the blade 14. In a preferred embodiment, the blade 14 is an elongated generally rectangular member actuated by a fluid piston means. The blade 14 is disposed so that its elongated dimension or length is substantially transverse of the length of the strap, i.e., with the end of the blade generally parallel to the length of the strap. The width dimension W of the blade, which dimension is disposed substantially parallel to the longitudinal axis of the strap, is selected to produce a weld of the desired length which may be, for example, in the range of about a quarter of an inch to about an inch and a half.

The roundness of the corners 31 of the blade 14 is of critical importance in the production of the novel improved welds of this invention. It has been surprisingly discovered that only knives with rounded corners 31, i.e., corners having a radius R in the range of about 0.005 to about 0.03 inches will produce welds having cavities within the annular solidified portions or "loops" that are in the fused interfacial region. Deterioration in strap joint strength takes place with corners that are too sharp as well as with corners that are too round.

Although the thickness of the blade 14 is not overly critical, the blade must be thick enough so that the generally rectangular cross-section of the blade is well defined and corners 31 may have an effective radius as above-described, and also to provide the necessary heat input to the surfaces that are to be joined. A suitable blade thickness, for example, is in the range of about one-sixteenth of an inch to about one-quarter of an inch. The blade may be made of any material which has the necessary heat capacity to soften the strap surfaces that come in contact therewith and which will heat the strap to the required sealing temperatures while still maintaining its shape. Preferably, the heatable sealing blade is of stainless steel, although cold rolled steel has also been successfully used.

Figure 3:
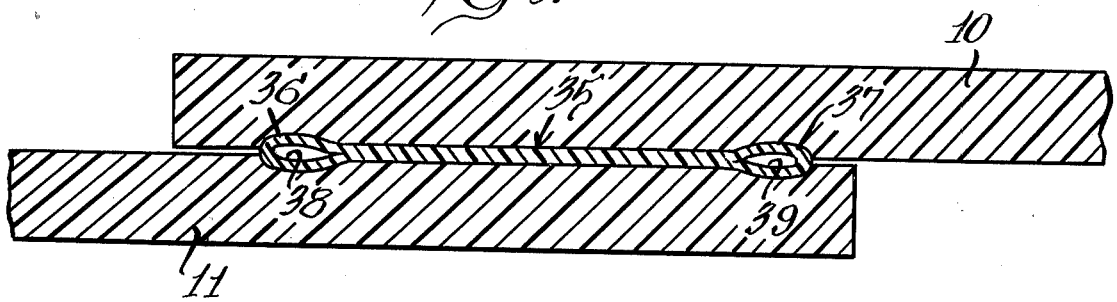
FIG. 3 is an enlarged sectional view of a weld embodying the present invention.

FIG. 3 is a cross-sectional view of one embodiment of a weld produced by joining two ends 10 and 11 of thermoplastic strap using the hot sealing blade of this invention. The weld comprises a fused interfacial region 35 which is approximately equal to or slightly greater in length than the width W of the blade 14. Included in the fused interfacial region 35 of each end is an annular mass such as loops 36 and 37 defining a pair of spaced cavities 38 and 39 which extend substantially across the width of the strap. Preferably, the cavities have cross-sectional length-to-thickness ratios of about 1:1 and greater. A particularly preferred cavity length-to-thickness ratio is about 4:1. For example, a microscopic study made of a weld having the configuration shown in FIG. 3 and having a joint strength of about 95 percent revealed that the thickness of the portion of the weld without the cavities was 0.005 inch, that the portion of the weld containing the cavities had a thickness of 0.011 inch and that the defined cavity was about 0.023 inch in length with respect to the longitudinal direction of the strap and about 0.004 inch in thickness at the thickest point thereof. The weld was produced in a thermoplastic strap made of an oriented polymeric material (polyethylene terephthalate), having a thickness of 0.020 inch.

In contrast to the weld of FIG. 3, a prior art weld 41 is shown in FIG. 4. The prior art weld is produced by a typical prior art knife blade 51, shown in FIG. 5, having side edges 53 and 54 which taper to a point. As a result, the prior art weld 41 has tapered ends 43 and 44 which generally reflect the shape of the prior art knife 51. Welds produced by tapered knives such as the weld illustrated in FIG. 4 have lower joint strengths than the novel welds produced in accordance with this invention.

Another embodiment of the present invention is shown in FIG. 6 which is a top view of overlapping ends 60 and 61 welded in accordance with the present invention. The fused interfacial region 62 includes a plurality of annular masses 63 and 64, each defining therewithin an elongated cavity such as the respective cavities 65 and 66. Within fused interfacial region 62, the cavities 65 and 66 extend across the width of the strap from one edge 67 of the strap, beyond the midline of the strap, and the remaining cavities extend in the same manner from the opposite edge 69 of the strap. As illustrated, the interfacial region 62 has four cavities: paired cavities 65 extend from one edge 67 of the strap to a point slightly beyond the midline 67 of the strap. Another set of paired cavities 66 extend from the other edge 69 of the strap to a point slightly beyond the midline 67 of the strap. Although it is generally preferred to have equal numbers of cavities 65 and 66 extending from each side of the strap, it is possible to have unequal numbers extending from each side of the strap so long as the cavities collectively form at least two complete spans across the strap. Such cavities can be made by positioning one sealing blade of this invention partially between the overlapping ends of the strap from one side of the strap, and similarly positioning another sealing blade partially between the overlapping end portions from the other side of the strap. The ends of both blades should extend slightly beyond the midline of the strap to ensure that the loops will collectively span the strap.

FIG. 7 is an enlarged sectional view of another embodiment of a weld of the present invention. The weld between two overlapping ends 70 and 71 of thermoplastic strap has a fused interfacial region 72 which includes two spaced annular masses 73 and 74, each defining a respective elongated cavity 75 and 76 therewithin. This weld may be produced by inserting between opposing faces of the overlapping end portions a pair of sealing blades 80 and 81 having transverse cross sections shown in FIG. 8. The configuration of these blades is such that the outer sides 82 and 83 thereof have rounded corners 84, 86 and 85, 87, respectively, each having a radius R of about 0.005 inches to about 0.03 inches. The inner sides of each blade 80 and 81 taper to sharp edges 88 and 89. To make the weld shown in FIG. 7, the blades are disposed with sharp edges 88 and 89 adjacent to each other and in a spaced relationship as is shown in FIG. 8.

When the overlapping ends of a thermoplastic strap are joined in the manner provided by this invention, a thermoplastic strap loop having a welded joint of enhanced strength is formed. The joint comprises at least one fused interfacial region including a plurality of substantially annular solidified portions of the general type described above. The strap loop may have a weld which comprises a pair of said substantially annular solidified portions that are contiguous to one another; or a weld which comprises a pair of substantially annular solidified portions that are spaced from one another; or a weld which has a plurality of substantially annular solidified portions wherein about one-half of the solidified portions extend from the longitudinal edge of the strap transversely across the width of the strap to a location beyond the longitudinal midline of the strap and wherein the remaining solidified portions extend from the opposite longitudinal edge of the strap to a location beyond the longitudinal midline of the strap.

Regardless of the embodiment of the weld which is chosen, a thermoplastic strap loop made in accordance with this invention will be much stronger than strap loops provided with prior art welds. The advantages provided by the welds of the present invention are illustrated by the following examples in which polyester strap having a width of 0.5 inch, a thickness of 0.021 inch and having a strap strength of 575 pounds was welded in accordance with the above-described method of this invention. In all examples, the platen pressure exerted on the blade during heating was 50 pounds per square inch (psi) and the force exerted in removing the blade from between the overlapping end portions was also 50 psi. Unless otherwise indicated, the clamping pressure holding the end portions against the blade and the clamping pressure holding the softened faces of the end portions together after the blade has been removed was 20 psi. The strap ends to be joined were held together under this pressure, and the blade was forced in between the ends in a direction substantially normal to the longitudinal centerline of the strap.

The blade temperature, blade dwell time (time during which the blade is in stationary pressure contact with the faces of the ends), and cooling time (time during which the softened faces are held together after removal of the blade) were varied as indicated below, in order to determine the effect thereof on the joint strength of the splice.

EXAMPLE 1

The blade used for welding the straps in this example was made of stainless steel and had corners with a radius in the range of 0.0156 to 0.0312 inches. The strap welding parameters are summarized below:

Blade Temperature 1000° F.
Blade Dwell Time 8 milliseconds
Cooling Time 3000 milliseconds Ten strap joints were welded in accordance with these parameters. The joint strength in each instance was tested by placing the welded portions of the straps under increasing tension until the weld completely failed. The test results are summarized in Table 1 below in terms of the force required to cause failure of the weld and in terms of the strength of the weld as a percentage of the strength of an unwelded portion of the strap (575 pounds for all of the straps tested in all of the examples) tested by the same method.

Table 1

| | Strap Joint Strength | |
| Test No. | Lbs. | Percent of Strap Strength |
| --- | --- | --- |
| 1 | 500 | 87 |
| 2 | 510 | 89 |
| 3 | 520 | 90 |
| 4 | 560 | 97 |
| 5 | 510 | 89 |
| 6 | 500 | 87 |

Table 1-continued

| Test No. | Strap Joint Strength | |
|---|---|---|
| | Lbs. | Percent of Strap Strength |
| 7 | 500 | 87 |
| 8 | 500 | 87 |
| 9 | 510 | 89 |
| 10 | 510 | 89 |
| Avg. | 512 | 89 |

As can be seen by the above-listed results, the average joint strengths was 89% of the strap strength. These are excellent results, especially in view of the consistency of the test results.

EXAMPLE 2

Ten strap joints were formed using the blade of Example 1 in accordance with the parameters summarized below in Table 2, in order to determine the effect of varying the blade dwell time and cooling time on joint strength.

Blade Temperature 1000° F.
Blade Dwell Time 0 milliseconds*
Cooling Time 70 milliseconds

*A dwell time of 0 milliseconds indicates that the blade was inserted and immediately withdrawn from between overlapped strap ends without a pause other than the instantaneous pause inherent in the reversal of travel direction of the sealing blade.

Table 2

| Test No. | Strap Joint Strength | |
|---|---|---|
| | Lbs. | Percent of Strap Strength |
| 1 | 430 | 75 |
| 2 | 450 | 78 |
| 3 | 420 | 73 |
| 4 | 400 | 69 |
| 5 | 420 | 73 |
| 6 | 420 | 73 |
| 7 | 440 | 76 |
| 8 | 320 | 56 |
| 9 | 460 | 80 |
| 10 | 410 | 71 |
| Avg. | 417 | 72.5 |

The foregoing results show that the joint strength of the weld was somewhat less than that produced with longer dwell and cooling times in Example 1.

EXAMPLES 3-6

Four tests were run in which ten straps were welded under the same conditions as in Example 2 with the exception that the blade temperature was varied. These welds were tested for joint strength, and the results are tabulated below in Table 3.

Table 3

| | Test | | | |
|---|---|---|---|---|
| | A | B | C | D |
| | Knife Temperature | | | |
| | 975° F. | 950° F. | 925° F. | 900° F. |
| | Joint Strength in Pounds | | | |
| Strap 1 | 450 | 440 | 450 | 420 |
| Strap 2 | 430 | 490 | 380 | 420 |
| Strap 3 | 510 | 480 | 480 | 440 |
| Strap 4 | 380 | 400 | 410 | 430 |
| Strap 5 | 510 | 440 | 380 | 500 |
| Strap 6 | 510 | 450 | 490 | 410 |
| Strap 7 | 470 | 440 | 470 | 470 |
| Strap 8 | 410 | 520 | 480 | 280 |
| Strap 9 | 480 | 440 | 440 | 420 |
| Strap 10 | 250 | 490 | 430 | 420 |
| Average Joint Strength (Lbs) | 461* | 459 | 441 | 436* |
| Joint Strength as a percentage of Strap Strength (Strap Strength = 575 Lb.) | 80.2%* | 79.8% | 76.7% | 75.9%* |

*In Test A, the average was computed based upon the results of straps 1–9, strap 10 was deleted as it appeared to be an anomalous result. Similarly, in Test D, the results for strap 8 were deleted in computing the average.

Tests A–D also demonstrate a correlation between the blade temperatre and the joint strength, since the average joint strength decreases as the temperature of the blade decreases.

EXAMPLE 7

Ten straps were welded using a blade having an effective radius in the range of 0.005 to 0.010 inches. All of the other conditions were identical to those in Example 1. The average joinr strengths of the welds was nearly equal to the joint strengths in the welds of Example 1, as is shown in Table 4.

Table 4

| Test No. | Strap Joint Strength | |
|---|---|---|
| | Lbs. | Percent of Strap Strength |
| 1 | 480 | 83 |
| 2 | 480 | 83 |
| 3 | 460 | 80 |
| 4 | 540 | 94 |
| 5 | 520 | 90 |
| 6 | 520 | 90 |
| 7 | 560 | 97 |
| 8 | 520 | 90 |
| 9 | 540 | 94 |
| 10 | 500 | 87 |
| Avg. | 512 | 89 |

EXAMPLE 8

Ten straps were welded in the same manner as in Example 7. The average joint strengths of the welds, which are shown in Table 5, were nearly identical to the joint strengths obtained in Example 7, and demonstrate the reproducibility of the test.

Table 5

| Test No. | Strap Joint Strengths | |
|---|---|---|
| | Lbs. | Percentage of Strap Strength |
| 1 | 510 | 89 |
| 2 | 480 | 83 |
| 3 | 510 | 89 |
| 4 | 510 | 89 |
| 5 | 530 | 92 |
| 6 | 490 | 85 |
| 7 | 500 | 87 |
| 8 | 530 | 92 |
| 9 | 510 | 89 |
| 10 | 510 | 89 |
| Avg. | 508 | 88.3 |

EXAMPLES 9-15

In each of Examples 9-15, ten straps were welded with a blade having square, sharp corners of an effective radius less than 0.003 inches.

In Examples 9 and 10, the test conditions were identical to those of Example 1. The joint strengths of the welds, presented in tabular form below, viewed together with the results of Examples 1, 7 and 8, demonstrate that a rectangular knife blade having slightly rounded corners, i.e., corners having an effective radius greater than 0.003 inches, produce much stronger welds under the same operating conditions than welds produced by a blade with sharp corners, i.e., corners having an effective radius less than 0.003 inches. The results were tabulated in Table 6 and Table 7 below, for Examples 9 and 10, respectively.

Table 6

| Test No. | Strap Joint Strengths | |
|---|---|---|
| | Lbs. | Percentage of Strap Strength |
| 1 | 420 | 73 |
| 2 | 380 | 66 |
| 3 | 440 | 76 |
| 4 | 490 | 85 |
| 5 | 440 | 76 |
| 6 | 420 | 73 |
| 7 | 300 | 52 |
| 8 | 410 | 71 |
| 9 | 400 | 69 |
| 10 | 390 | 68 |
| Avg. | 409 | 71 |

Table 7

| Test No. | Strap Joint Strengths | |
|---|---|---|
| | Lbs. | Percentage of Strap Strength |
| 1 | 410 | 71 |
| 2 | 460 | 80 |
| 3 | 460 | 80 |
| 4 | 430 | 75 |
| 5 | 380 | 66 |
| 6 | 460 | 80 |
| 7 | 490 | 85 |
| 8 | 400 | 69 |
| 9 | 440 | 76 |
| 10 | 430 | 75 |
| Avg. | 436 | 75.8 |

In each of Examples 11-15, the operating conditions were as follows:

| | Examples | | | | |
|---|---|---|---|---|---|
| | 11 | 12 | 13 | 14 | 15 |
| Blade Temperature | 700° F. | 725° F. | 750° F. | 725° F. | 800° F. |
| Normal Force (psi) | 50 | 50 | 50 | 50 | 50 |
| Clamping Force (psi) | 50 | 50 | 50 | 50 | 50 |
| Blade Dwell Time (millisecs) | 8 | 8 | 8 | 8 | 8 |
| Cooling Time (millisecs) | 50 | 50 | 50 | 50 | 50 |

The joint strengths of these welds produced by rectangular blades having sharp corners were far weaker than those produced by rectangular blades having slightly rounded corners used in Examples 1-8, as is shown in the following table:

Table 8

| Strap No. | Examples (Joint strength in Lbs.) | | | | |
|---|---|---|---|---|---|
| | 11 | 12 | 13 | 14 | 15 |
| 1 | 340 | 360 | 380 | 400 | 260 |
| 2 | 250 | 390 | 380 | 330 | 350 |
| 3 | 290 | 330 | 390 | 320 | 430 |
| 4 | 400 | 390 | 380 | 250 | 390 |
| 5 | 410 | 200 | 380 | 280 | 260 |
| 6 | 310 | 410 | 390 | 430 | 370 |
| 7 | 370 | 440 | 460 | 260 | 340 |
| 8 | 310 | 330 | 410 | 360 | 290 |
| 9 | 400 | 340 | 300 | 390 | 350 |
| 10 | 300 | 320 | 460 | 340 | 380 |
| Avg. | 338 | 351 | 387 | 341 | 342 |
| Avg. Percent of joint strength of strap | 58.8% | 61% | 67% | 59.3% | 59.5% |

I claim:

1. An improved weld joining the overlapping end portions of a thermoplastic polymeric strap comprising at least one fused interfacial region which includes an annular mass defining therewithin at least one elongated cavity; at least two of said cavities being present within said region and collectively spanning the width of the strap.

2. The weld of claim 1 wherein the fused interfacial region includes an annular mass defining a pair of spaced cavities that extend substantially across the width of the strap.

3. The weld of claim 1 wherein the fused interfacial region includes a pair of spaced annular masses each defining an elongated cavity therewithin.

4. The weld of claim 1 wherein the thermoplastic strap is made of an oriented polymeric material.

5. The weld of claim 1 wherein the fused interfacial region includes a plurality of annular masses each defining an elongated cavity, and wherein about one-half of the cavities extend transversely across the width of the strap from one longitudinal edge of the strap to a location beyond the midline of the strap and the remaining cavities extend in the same manner from the opposite edge of the strap.

6. A thermoplastic strap loop having overlapping end portions joined by a weld which comprises at least one fused interfacial region including a plurality of substantially annular solidified portions each defining therewithin at least one elongated cavity and which collectively span the width of the strap.

7. The thermoplastic strap loop of claim 6 wherein the weld comprises a pair of said substantially annular solidified portions that are contiguous to one another.

8. The thermoplastic strap loop of claim 6 wherein the weld comprises a pair of said substantially annular solidified portions that are spaced from one another.

9. The thermoplastic strap loop of claim 6 wherein the weld comprises a plurality of substantially annular solidified portions, wherein about one-half of the solidified portions extend from one longitudinal edge of the strap transversely across the width of the strap to a location beyond the longitudinal midline of the strap, and wherein the remaining solidified portions extend from the opposite edge of the strap to a location beyond the longitudinal midline of the strap.

* * * * *